United States Patent [19]

Meyers

[11] Patent Number: 4,878,707
[45] Date of Patent: Nov. 7, 1989

[54] AIR DEFLECTOR FOR MAINTAINING CLEANLINESS OF WINDOWS OF A VEHICLE

[75] Inventor: Arnold G. Meyers, Waterloo, Canada

[73] Assignee: Clemmer Industries Limited, Waterloo, Canada

[21] Appl. No.: 200,469

[22] Filed: May 31, 1988

[30] Foreign Application Priority Data

Feb. 8, 1988 [CA] Canada .................................. 558408

[51] Int. Cl.4 ........................................... B60J 1/20
[52] U.S. Cl. .................. 296/91; 296/180.1; 296/180.2
[58] Field of Search ............... 296/180.1, 180.2, 180.3, 296/180.4, 180.5, 91

[56] References Cited

U.S. PATENT DOCUMENTS

| 2,933,344 | 4/1960 | Shumaker | 296/91 |
| 3,010,754 | 11/1961 | Shumaker | 296/91 |
| 3,427,067 | 2/1969 | Kish | 296/91 |
| 4,170,323 | 10/1979 | Helm | 296/91 X |
| 4,170,381 | 10/1979 | Helm | 296/91 |
| 4,674,788 | 6/1987 | Ohmura et al. | 296/91 X |
| 4,743,057 | 5/1988 | Loren | 296/180.1 |

FOREIGN PATENT DOCUMENTS

| 1903841 | 11/1970 | Fed. Rep. of Germany | 296/91 |
| 2233409 | 1/1974 | Fed. Rep. of Germany | 296/91 |
| 2548109 | 5/1977 | Fed. Rep. of Germany | 296/91 |
| 0197805 | 5/1978 | Fed. Rep. of Germany | 296/91 |
| 2726739 | 1/1979 | Fed. Rep. of Germany | 296/91 |

Primary Examiner—Johnny D. Cherry
Assistant Examiner—Andrew C. Pike
Attorney, Agent, or Firm—Daryl W. Schnurr

[57] ABSTRACT

An air deflector is used on a truck, there being one deflector for each side window. Each deflector has an oblong panel with means for mounting the deflector onto a front corner of the truck with an inner surface of the panel facing the truck and a longitudinal centre line of the panel being substantially parallel to a longitudinal centre line of said corner. The panel curves smoothly around said corner and the gap between the panel and the truck increases slightly from front to rear. The panel has a folded rear edge that is folded towards said truck. The panel is held in place by upper and lower brackets mounted between the deflector and the truck, the brackets continuously decreasing in width from front to rear of the deflector and being curved to correspond to the arcuate cross section of the panel. The deflector directs air beneath the side window nearest to it, thereby maintaining the cleanliness of the side window for a much longer period.

7 Claims, 4 Drawing Sheets

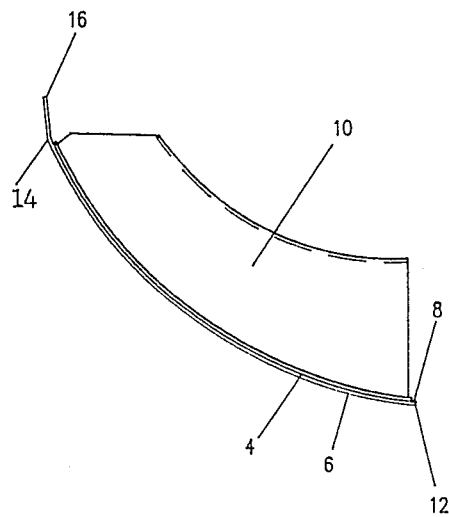
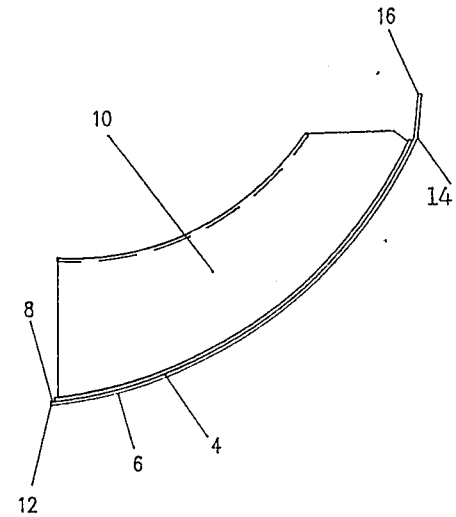
FIGURE 1
FIGURE 2

AIR DEFLECTOR FOR MAINTAINING CLEANLINESS OF WINDOWS OF A VEHICLE

BACKGROUND OF THE INVENTION

1. Field of the Invention

This invention relates to air deflectors for use on tractors having side windows, the purpose of the deflectors being to keep the side windows clean for a much longer period of time than would otherwise occur.

"Tractor", as used in this specification is defined to include trucks and tractors for use with trailers but does not include farm tractors.

2. Description of the Prior Art

It is common to use deflectors on the roof of a cab of a truck or tractor to deflect air around a trailer in an attempt to increase gas mileage. It is not common to use deflectors to keep a side window of a tractor clean. The problem of dirt or salt from a roadway obscuring the view from a side window of a tractor is particularly acute during the wintertime or when the right surface is wet. Previously, when the side windows became too obscure, an operator of the tractor would stop the tractor and clean the windows by hand. Too often, instead of stopping to clean the side windows, the operator would continue to operate the tractor even though the condition of the side windows made that operation relatively unsafe. When the side windows are fully or partially obscured, the rearview side mirrors are also fully or partially obscured. This can lead to dangerous situations, particularly when the tractor is being operated with a single trailer, double trailer or triple trailer on an expressway. Since the condition of the side windows deteriorates slowly with time, there is a tendency to prolong the cleaning of the windows until they are completely obscured. Further, it may be dangerous to stop the tractor on a shoulder of a highway to clean the windows. Also, dirt, particularly salt can build-up on the windows rather quickly, depending on the road conditions, thereby causing the tractor to be stopped several times during a single trip and causing serious inefficiencies.

It is therefore extremely beneficial to provide a device for keeping the side windows clean for a much longer period of time than would otherwise occur, said device operating automatically and not being dependent on the whims of the operator of the tractor.

SUMMARY OF THE INVENTION

An air deflector for use on a tractor having at least one side window, the purpose of said deflector being to keep the side window clean has an oblong panel with two ends, a forward edge and a rear edge. The panel has an arcuate cross section with an interior surface on the inner curve of the arcuate cross section and an exterior surface on an outer curve of the arcuate cross section. There are means for mounting the deflector on a front corner of the tractor with the inner surface facing the tractor and a longitudinal centre line of said panel being substantially parallel to a longitudinal centre line of said corner. The corner is the first corner to a front of said side window. The forward edge of the panel extends slightly along a front of the tractor and the rear edge extends slightly along a side of the tractor. A flange extends along the rear edge of said deflector, the flange being angled towards said tractor. The panel is held in place by upper and lower brackets mounted between the deflector and the tractor. The brackets continuously decrease in width from front to rear of said deflector and are curved to correspond to the arcuate cross section of said panel. A space between the panel and the tractor decreases in size from front to rear of said deflector. An upper end of the deflector is at a level substantially lower than the side window nearest the deflector. When the tractor is moving forward, the deflector creates a strong air flow from front to rear of said tractor partially along the side of the tractor where the deflector is located, said air flowing beneath the side window on the same side as the deflector. The air flow keeps the side window clear from road contaminants for a much longer period of time than would otherwise occur.

A method of keeping the side window of a tractor clean from road contaminants for a much longer period of time than would otherwise occur includes the steps of mounting a suitable deflector on a front corner of said tractor at a level substantially below said side window, creating a strong air flow past said deflector from a front to rear partially along a side of said tractor beneath said window, thereby preventing most contaminated air from said road surface from contacting said side window.

BRIEF DESCRIPTION OF THE DRAWINGS

In drawings which illustrate a preferred embodiment of the invention:

FIG. 1 is a sectional top view of a panel for a right deflector when viewed from a rear of the tractor;

FIG. 2 is a sectional top view of a panel for a left deflector when viewed from a rear of the tractor;

DESCRIPTION OF A PREFERRED EMBODIMENT

Figure 3:
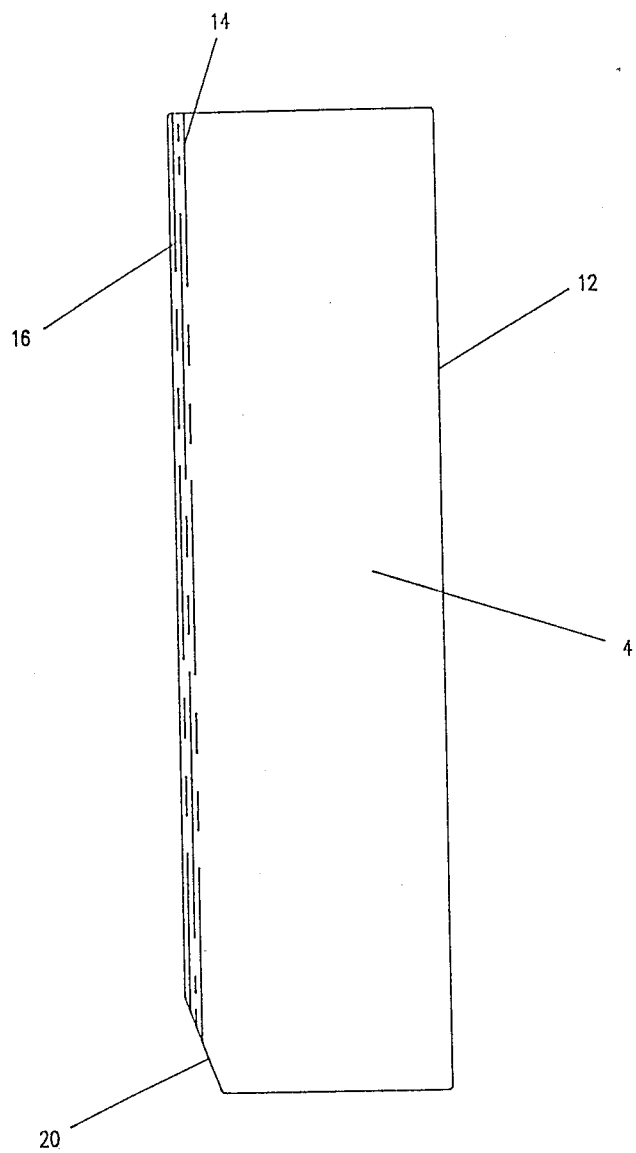
FIG. 3 is a front view of a panel of a right deflector when viewed from the rear of the tractor.

Referring to FIG. 1 in greater detail, a right deflector 2 has a panel 4 with outer surface 6 and interior surface 8. An upper bracket 10 is affixed to the inner surface 8. The deflector has a forward edge 12 and a rear edge 14 with a flange 16 extending from said rear edge and being angled towards said inner surface 8. It should be noted that the bracket 10 decreases in width slightly from front to rear so that a space between the panel and a tractor (not shown in FIG. 1) would also decrease in size from front to rear.

FIG. 2 shows a left deflector 18 that is a mirror image of the right deflector 2 shown in FIG. 1. The reference numerals for the components of the deflector 2 are used to identify the same components of the deflector 18 in FIG. 2.

From FIG. 3, it can be seen that a lower rear corner 20 of the panel 4 of the right deflector 2 is cut off. The purpose of cutting off the corner 20 is to allow for a fender on the tractor (not shown in FIG. 3).

Figure 4:
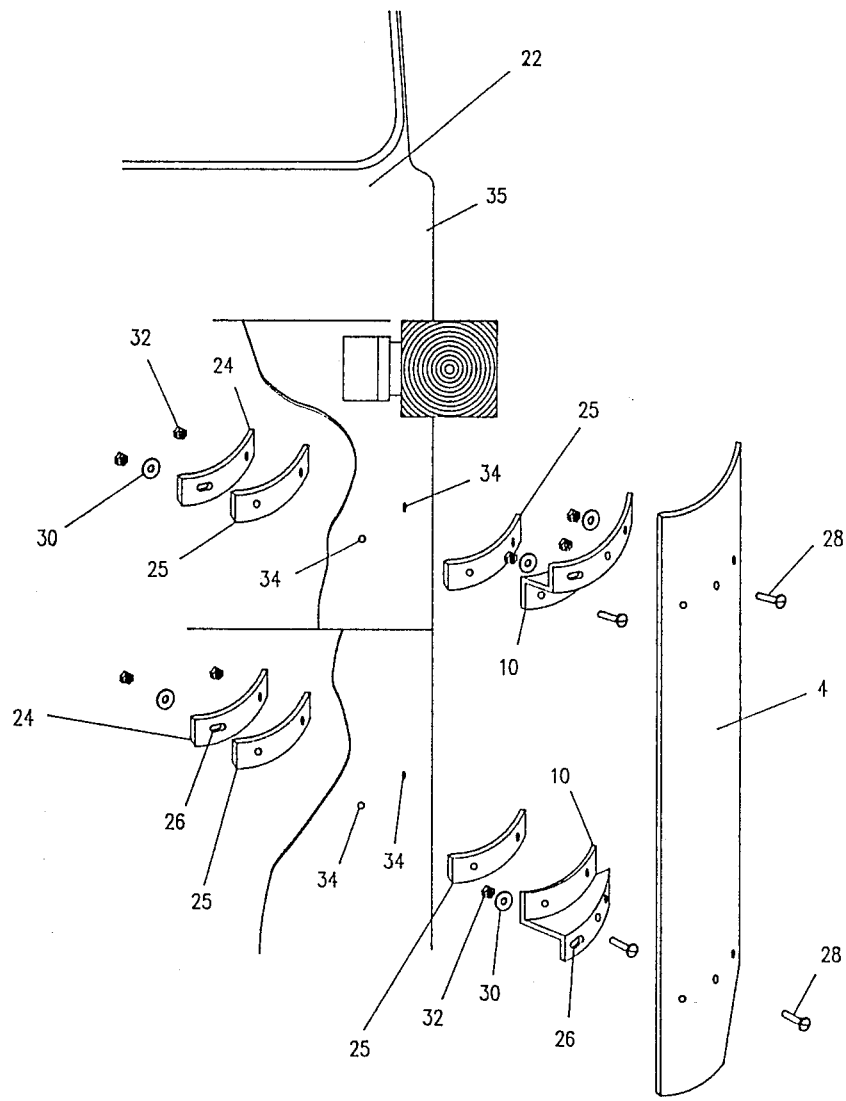
FIG. 4 is an exploded perspective view of a left deflector when viewed from a rear of the tractor, said deflector being shown in relation to a partial view of the tractor.

In FIG. 4, the left deflector 18 is shown in a position where it is about to be mounted on a tractor 22. One curved bracket 24 and two gaskets 25 accompany the bracket 10. Each of the brackets have suitable openings 26 for receiving bolts 28 which are held in place by washers 30 and nuts 32. Some of the openings 26 are slotted openings so that small adjustments can be made in the positioning of the brackets. As can be seen, suitable openings 34 must be made in a front corner 35 of the tractor 22.

The specific deflectors shown in the drawings are designed for MACK ULTRALINER (a trade mark) tractors. It will be obvious to those skilled in the art to make small variations to the deflector, while applying the teachings of the present application, to use the deflector on other tractors.

Figure 5:
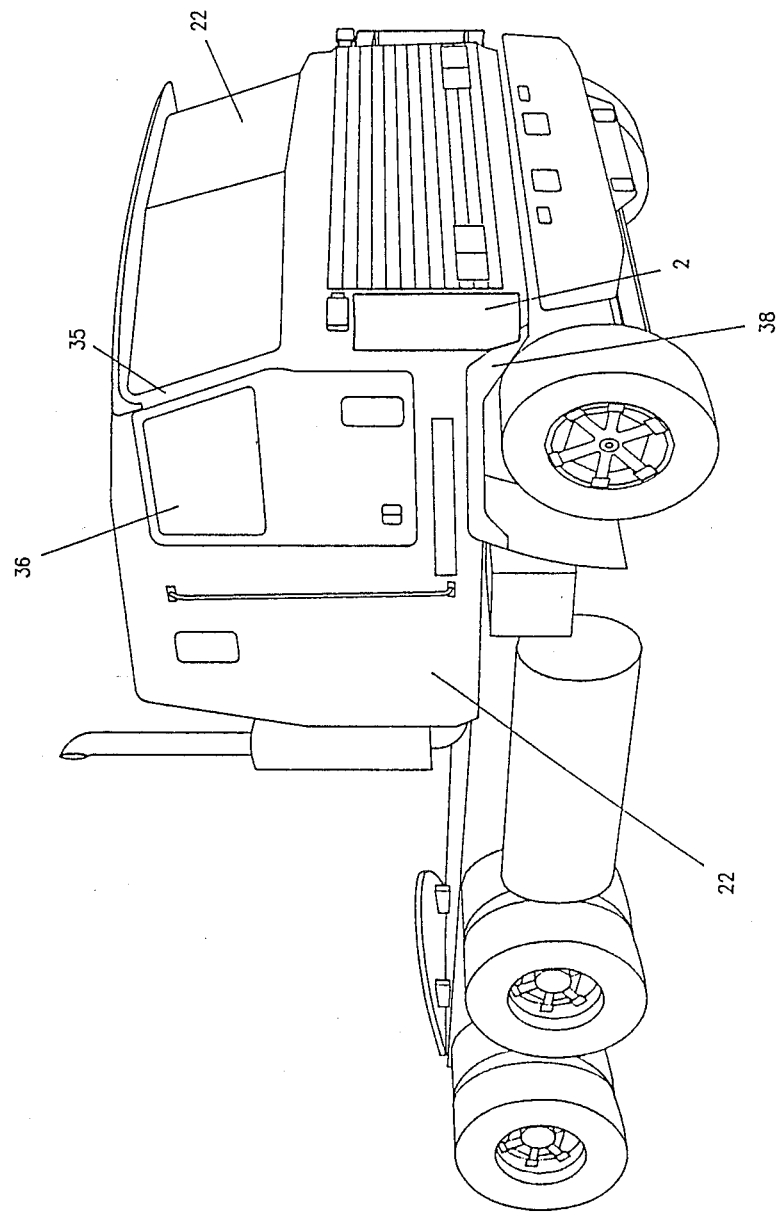
FIG. 5 is a schematic perspective view showing the general location of a deflector on the right side when viewed from the rear of the tractor in relation to a side window of the tractor.

In FIG. 5, it can be seen that the right deflector 2 is mounted on the front right corner of the tractor 22 at a level substantially lower than a side window 36. The deflector 2 is mounted so that a space beween the tractor and the panel 4 decreases slightly from front to rear. The panel 4 is mounted so that a forward edge 12 extends slightly along a front of the tractor 22 and a rear edge 14 extends slightly along a side of the tractor 22. The left deflector is mounted in an identical manner on the opposite side of the tractor (not shown). It can be seen that the corner 20 is cut away to allow for a fender 38.

The deflectors for use with a MAC ULTRALINER tractor are preferably designed so that the panel has a radius of approximately 8 inches through a centre portion and a smaller radius near either edge. Further, the angle of the flange relative to an interior surface of the panel immediately adjacent to the flange is aproximately 120 degrees. Also, as can be seen from FIG. 3, the panel is slightly wider at an upper end than at a lower end.

Preferably, the panel is made of stainless steel but other materials will be suitable. Further, without limiting the invention to specific dimensions, it has been found that a panel with dimensions of approximately 7.5 inches in width and approximately 31.5 inches in height works satisfactorily on a MAC ULTRALINER tractor.

It is believed that the deflector creates a strong air flow from front to rear partially along a side of the tractor at a level beneath the side window. The air flow thereby prevents most contaminated air in the road surface from reaching the side window. In winter driving on salted highways, it has been found that the side window has remained clean after 3,000 miles of driving even though those portions of the front windshield that cannot be reached by the wiper blades and the lower portion of the side of the tractor is covered with dried dirt and salt. The windows have remained clear for even longer travel distances than 3,000 miles.

What I claim as my invention is:

1. An air deflector for use on a tractor having at least one side window, the purpose of said deflector being to keep the side window clean, said deflector comprising an oblong panel having two ends, a forward edge and a rear edge, said panel having an arcuate cross section, an interior surface on an inner curve of the arcuate cross section and an exterior surface on an outer curve of the arcuate cross section, with means for mounting said deflector on a front corner of said tractor with said inner surface facing said tractor and a longitudinal centre line of said panel being substantially parallel to a longitudinal centre line of said corner, said corner being the first corner to a front of said side window, said forward edge extending slightly along a front of said tractor and said rear edge extending slightly along a side of said tractor, a flange extending along said rear edge of said deflector, said flange being angled towards said tractor, said panel being held in place by upper and lower brackets between the deflector and the tractor, said brackets continuously decreasing in width from front to rear of said deflector and being curved to correspond to the arcuate cross section of said panel, a space between said panel and said tractor continuously decreasing in size from front to rear of said deflector, an upper end of said deflector being at a level substantially lower than the side window nearest to said deflector, the deflector, when the tractor is moving forward, creating a strong air flow from front to rear of said tractor partially along that side of the tractor where the deflector is located, said air flowing beneath the side window on the same side as the deflector, thereby keeping said window clear from road contaminants for a much longer period of time than would otherwise occur.

2. An air deflector as claimed in claim 1 wherein the curvature of the panel has a radius of approximately 8 inches through a central portion and a smaller radius near either edge.

3. An air deflector as claimed in 2 wherein the angle of the flange relative to an interior surface of the panel immediately adjacent to the flange is approximately 120 degrees.

4. An air deflector as claimed in claim 3 wherein the panel is slightly wider at an upper end than at a lower end.

5. An air deflector as claimed in claim 4 wherein a lower rear corner of said panel is cut off.

6. An air deflector as claimed in claim 5 wherein the panel is made of stainless steel.

7. An air deflector as claimed in claim 6 wherein the panel has dimensions of approximately 7.5 inches in width and approximately 31.5 inches in height.

* * * * *